(12) United States Patent
Liu et al.

(10) Patent No.: US 12,536,477 B2
(45) Date of Patent: Jan. 27, 2026

(54) ENSEMBLE COUPLED ASSIMILATION SYSTEM FOR NUMERICAL PREDICTION AND METHOD THEREOF

(71) Applicant: TSINGHUA UNIVERSITY, Beijing (CN)

(72) Inventors: Li Liu, Beijing (CN); Chao Sun, Beijing (CN); Ruizhe Li, Beijing (CN); Bin Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 922 days.

(21) Appl. No.: 17/778,822

(22) PCT Filed: Dec. 3, 2019

(86) PCT No.: PCT/CN2019/122765
§ 371 (c)(1),
(2) Date: May 20, 2022

(87) PCT Pub. No.: WO2021/097917
PCT Pub. Date: May 27, 2021

(65) Prior Publication Data
US 2022/0398505 A1    Dec. 15, 2022

(30) Foreign Application Priority Data
Nov. 22, 2019 (CN) .......................... 201911154881.1

(51) Int. Cl.
*G06N 20/20* (2019.01)
(52) U.S. Cl.
CPC .................. *G06N 20/20* (2019.01)

(58) Field of Classification Search
CPC .............................. G06N 20/20; G06N 20/00
USPC .......................................................... 706/12
See application file for complete search history.

(56) References Cited

U.S. PATENT DOCUMENTS

| | | | |
|---|---|---|---|
| 2007/0118346 A1* | 5/2007 | Wen | E21B 49/00 703/10 |
| 2012/0215511 A1* | 8/2012 | Sarma | G01V 1/308 703/10 |
| 2018/0156766 A1* | 6/2018 | Zeng | G01N 33/004 |
| 2018/0225396 A1* | 8/2018 | Lee | G06F 17/16 |

OTHER PUBLICATIONS

Anderson, "Ensemble Kalman filters for large geophysical applications", IEEE Control Systems, vol. 29, Issue: 3, Jun. 2009, pp. 66-82. (Year: 2009).*

Schulze-Riegert et al., "Data Assimilation Coupled to Evolutionary Algorithms—A Case Example in History Matching", SPE Reservoir Characterisation and Simulation Conference and Exhibition, Abu Dhabi, UAE, Oct. 2009. (Year: 2009).*

(Continued)

*Primary Examiner* — Hwei-Min Lu

(57) ABSTRACT

Disclosed is an ensemble coupled assimilation system for numerical prediction and the method thereof. The ensemble coupled assimilation system includes a module for integrating coupled models and managing collaborative ensemble operation, an assimilation algorithms integration module, a module for configuring ensemble coupled assimilation experiment, and an online interaction module for ensemble coupled assimilation.

10 Claims, 3 Drawing Sheets

(56) References Cited

OTHER PUBLICATIONS

Pan et al., "Impact of Accuracy, Spatial Availability, and Revisit Time of Satellite-Derived Surface Soil Moisture in a Multiscale Ensemble Data Assimilation System", IEEE Journal of Selected Topics in Applied Earth Observations and Remote Sensing, vol. 3, No. 1, Mar. 2010, pp. 49-56. (Year: 2010).*

Evangelinos et al., "Many Task Computing for Real-Time Uncertainty Prediction and Data Assimilation in the Ocean", IEEE Transactions on Parallel and Distributed Systems, vol. 22, No. 6, Jun. 2011, pp. 1012-1024. (Year: 2011).*

Montzka et al., "Multivariate and Multiscale Data Assimilation in Terrestrial Systems: A Review", Sensors 2012, 12, Nov. 26, 2012, pp. 16291-16333. (Year: 2012).*

Dong et al., "Comparison and Analysis of Data Assimilation Algorithms for Predicting the Leaf Area Index of Crop Canopies", IEEE Journal of Selected Topics in Applied Earth Observations and Remote Sensing, vol. 6, No. 1, Feb. 2013, pp. 188-201. (Year: 2013).*

Garcia et al., "Interfacing an ensemble Data Assimilation system with a 3D nonhydrostatic Coastal Ocean Model, an OSSE experiment", OCEANS 2016 MTS/IEEE Monterey, Sep. 2016, pp. 1-11. (Year: 2016).*

Carrassi et al., "Data Assimilation in the Geosciences—An overview on methods, issues and perspectives", arXiv ID: 1709.02798, Sep. 6, 2017, pp. 1-95. (Year: 2017).*

Bousserez et al., "Enhanced parallelization of the incremental 4D-Var data assimilation algorithm using the Randomized Incremental Optimal Technique (RIOT)", arXiv ID: 1906.01413, May 30, 2019, pp. 1-34. (Year: 2019).*

* cited by examiner

ENSEMBLE COUPLED ASSIMILATION SYSTEM FOR NUMERICAL PREDICTION AND METHOD THEREOF

The present disclosure claims the priority of the Chinese patent application No. CN201911154881.1 filed on Nov. 22, 2019 and entitled "Ensemble Coupled Assimilation System for Numerical Prediction and Method thereof", the entirety of which is incorporated herein by reference.

TECHNICAL FIELD

The present disclosure relates to the technical field of numerical prediction. In particular, the present disclosure relates to an ensemble coupled assimilation system and method for numerical prediction.

BACKGROUND

In view of the demand for extended-range prediction and the development of seamless prediction services, traditional numerical weather prediction based on atmospheric models is developing in the direction of coupled models and coupled assimilation technology. Compared with the coupled models, coupled assimilation is in the early stage of development. Assimilation methods face many challenging problems, and also it is a major challenge for assimilation methods to interact with the computer science in the aspect of how to build a general coupled assimilation framework.

Four-dimensional variational method (4D-Var) based on optimal control and ensemble Kalman filter based on ensemble prediction are widely used advanced assimilation methods in services, and both have advantages and disadvantages. However, a hybrid assimilation method that organically combines ensemble and variation (such as ensemble three-dimensional variational method, ensemble four-dimensional variational method, etc.) can effectively avoid the disadvantages of the both, and it gradually becomes the mainstream of data assimilation technologies in the future numerical prediction. When assimilation algorithms based on the same model ensemble prediction, such as ensemble Kalman filter or hybrid assimilation, are used to construct a coupled assimilation system (referred to as an ensemble coupled assimilation system), it is necessary to realize the interaction between all ensemble members of the corresponding coupled model and the assimilation algorithm.

The offline interaction based on file reading and writing is the earliest implementation method. Its basic concept is as shown in FIG. 1: continue maintaining the independence of operation between all ensemble members of the model and the assimilation module (i.e., the ensemble members of the model and the assimilation module perform independently), agree on the data file interface (data file format, variable name, etc.), and use the script control to realize the alternate restart, operation and interaction between the ensemble members the model and the assimilation module. Accordingly, this implementation method can keep the codes of the model and assimilation module unchanged as much as possible, so it is easy to be realized. This implementation method are adopted by many ensemble coupled assimilation systems, such as DART (Data Assimilation Research Testbed) developed by NCAR (National Center for Atmospheric Research) in the United States, CDA (coupled data assimilation) developed by GFDL (Geophysical Fluid Dynamics Laboratory) in the United States, GSI_EnKF (Gridpoint Statistical Interpolation_Ensemble Kalman Filter) developed by DTC (Developmental Testbed Center) in the United States, etc. Nonetheless, the implementation method suffers from the obvious disadvantage of low computational efficiency due to the high overhead of data file reading and writing operations and software (for the model and the assimilation modules) restarting process, and poor parallel scalability (e.g., FIG. 2). As the model resolution and assimilation frequency increase, the overhead of software restarting and data file reading and writing will continue to increase, while the operating speed of the assimilation system will continuously decrease. As a result, the timeliness of prediction results is limited, and even the prediction in the specified length of time cannot be completed within the wall clock time.

In order to avoid the above problems of offline interaction, PDAF (Parallel Data Assimilation Framework) that supports online interaction is developed by AWI (Alfred-Wegener-Institut für Polar- und Meeresforschung) in Germany. Its basic concept is as shown in FIG. 2: realize the parallel operation of all ensemble members of the model in the same MPI (i.e., the Message Passing Interface, configured to program parallel programs, and via MPI, almost all models realize parallel versions) task, realize direct calling of the same assimilation algorithm by all ensemble members of the model, and develop an MPI-based interaction module between the ensemble members of the model and the assimilation algorithm, so as to realize online interaction without file reading and writing and avoid restarting of the model. Although PDAF integrates multiple ensemble assimilation algorithms and has been applied to the development of assimilation systems of multiple models, its online interaction method is difficult to support coupled models. That is, it is difficult for PDAF to support the coupled assimilation, because 1) PDAF requires assimilated component models to use all of the MPI process, while in most coupled models, one component model only uses part of the MPI process of the coupled model; 2) in the coupled assimilation experiment, it may need to use different assimilation algorithms to assimilate multiple component models, but PDAF allows the use of only one assimilation algorithm, which imposes a limit on coupled assimilation. In addition, PDAF requires the assimilation algorithm to only use the MPI process of the first ensemble member of the model, which imposes a limit on the operating speed of the assimilation algorithm.

To sum up, the current development of ensemble coupled assimilation faces severe technical challenges. There is no ensemble coupled assimilation framework which is realized based on efficient online interaction method all over the world. Only the inefficient offline interaction method based on file reading and writing can be used to develop the ensemble coupled assimilation system.

SUMMARY

The embodiments of the present disclosure provide an ensemble coupled assimilation system for numerical prediction and a method thereof, which can realize collaborative operation of all ensemble members in the same coupled model in the same MPI task, support the flexible use of different assimilation algorithm instances by different component models, support one assimilation algorithm instance to use all MPI processes of all ensemble members of the corresponding component model to perform parallel operation, complete efficient online interaction between the model and the assimilation algorithm without using data file, and complete, in the online interaction process, a plurality of ensemble data operations, data interpolation between different grids, etc. Ultimately the operating efficiency of the corresponding assimilation system and the flexibility of assimilation configuration are improved.

The embodiments of the disclosure provide an ensemble coupled assimilation system for numerical prediction. The ensemble coupled assimilation system includes a module for integrating coupled models and managing collaborative ensemble operation, an assimilation algorithms integration module, a module for configuring ensemble coupled assimilation experiment and an online interaction module for ensemble coupled assimilation.

The module for integrating coupled models and managing collaborative ensemble operation is configured to integrate any coupled models to realize operations of configuration and compilation of a plurality of ensemble members in the same coupled model, and start simultaneous parallel operation of all the ensemble members in the same MPI task.

The assimilation algorithms integration module is configured to integrate any assimilation algorithms or assimilation algorithm libraries, and can automatically compile the assimilation algorithms or assimilation algorithm libraries into dynamic link libraries for indirect calling by the component models.

The module for configuring ensemble coupled assimilation experiment is configured to configure an ensemble coupled assimilation experiment by a user, and support the user to select the coupled models, to select the assimilation algorithm adopted by each component model, to set the number of the ensemble members, to set assimilation variables processed by each assimilation algorithm, and to set the assimilation frequency of each assimilation algorithm.

The online interaction module for ensemble coupled assimilation is configured to complete online interaction between the component models and the assimilation algorithms in the process of simultaneous parallel operation of all the ensemble members in the same coupled model in the same MPI task.

In one embodiment, the online interaction module for ensemble coupled assimilation includes an assimilation configuration information interface submodule, which is configured to read-in and parse the selection for the coupled models, the selection for the assimilation algorithms, the assimilation variables and the assimilation frequency configuration information from the module for configuring ensemble coupled assimilation experiment.

In one embodiment, the online interaction module for ensemble coupled assimilation also includes an assimilation algorithm operation management submodule, which is configured to manage all assimilation algorithm instances. In the process for starting assimilation algorithm operation instances, loading of dynamic link libraries and the assimilation algorithms therein is automatically completed.

In one embodiment, the online interaction module for ensemble coupled assimilation also includes an ensemble calculation operation submodule, which is configured to, according to the assimilation experiment configuration information and the input/output variables declared by the assimilation algorithms, automatically complete the ensemble operations for each variable when the component models interact with the assimilation algorithms.

In one embodiment, the online interaction module for ensemble coupled assimilation also includes a data online exchange submodule, which is configured to complete parallel data transfer of relevant variables between the MPI processes of all ensemble members of the same component model and the MPI process of the corresponding assimilation algorithm instance.

In one embodiment, the online interaction module for ensemble coupled assimilation also includes a data parallel interpolation submodule, which is configured to complete parallel interpolation of variable data between different grids when the component models are different from the corresponding assimilation algorithm instances in grid.

The embodiments of the disclosure provide an ensemble coupled assimilation method for numerical prediction that is realized based on the ensemble coupled assimilation system for numerical prediction. The method includes:

integrating assimilation algorithms or assimilation algorithm libraries, integrating all codes of the assimilation algorithms or the assimilation algorithm libraries and corresponding input data into an assimilation algorithms integration module, so as to enable the assimilation algorithms or the assimilation algorithm libraries to be automatically compiled into dynamic link libraries;

integrating coupled models, and integrating all codes of the coupled models and corresponding input data into the module for integrating coupled models and managing collaborative ensemble operation, so as to enable the all the ensemble members of the coupled models to be configured, compiled and simultaneously operated;

setting configurations for ensemble coupled assimilation experiment, after selecting the coupled model, setting the number of the ensemble members of the assimilation experiment, and selecting the assimilation algorithm used by each component model;

operating the ensemble coupled assimilation system, after completing the compiling of all the codes, using the module for integrating coupled models and managing collaborative ensemble operation to operate the ensemble coupled assimilation system.

In one embodiment, the step of integrating the assimilation algorithms or the assimilation algorithm libraries also includes: based on the APIs in the application program interface submodule, generating framework interface programs of the assimilation algorithms or the assimilation algorithm libraries, connecting starting programs, operating programs and ending programs of the assimilation algorithms or the assimilation algorithm libraries, completing declaration of input/output variables by the assimilation algorithms, connecting the input/output variables of the assimilation algorithms.

In one embodiment, the step of integrating coupled models also includes that the corresponding input data of the coupled models includes starting data and external-forcing data.

In one embodiment, the step of setting configurations for ensemble coupled assimilation experiment also includes that the assimilation variables and assimilation frequency of each assimilation algorithm instance are set.

DETAILED DESCRIPTION

The implementations of the present disclosure will be described in further detail below in conjunction with accompanying drawings of the description.

The implementations of the present disclosure provide an ensemble coupled assimilation system for numerical prediction. The system can realize collaborative operation of all ensemble members in the same coupled model in the same MPI task, support the flexible use of different assimilation algorithm instances by different component models, support one assimilation algorithm instance to use all MPI processes of all ensemble members of the corresponding component model to perform parallel operation, complete efficient online interaction between the model and the assimilation algorithm without using data file, and complete, in the online interaction process, a plurality of ensemble data operations, data interpolation between different grids, etc. Ultimately the operating efficiency of the corresponding assimilation system and the flexibility of assimilation configuration are improved.

Figure 1:
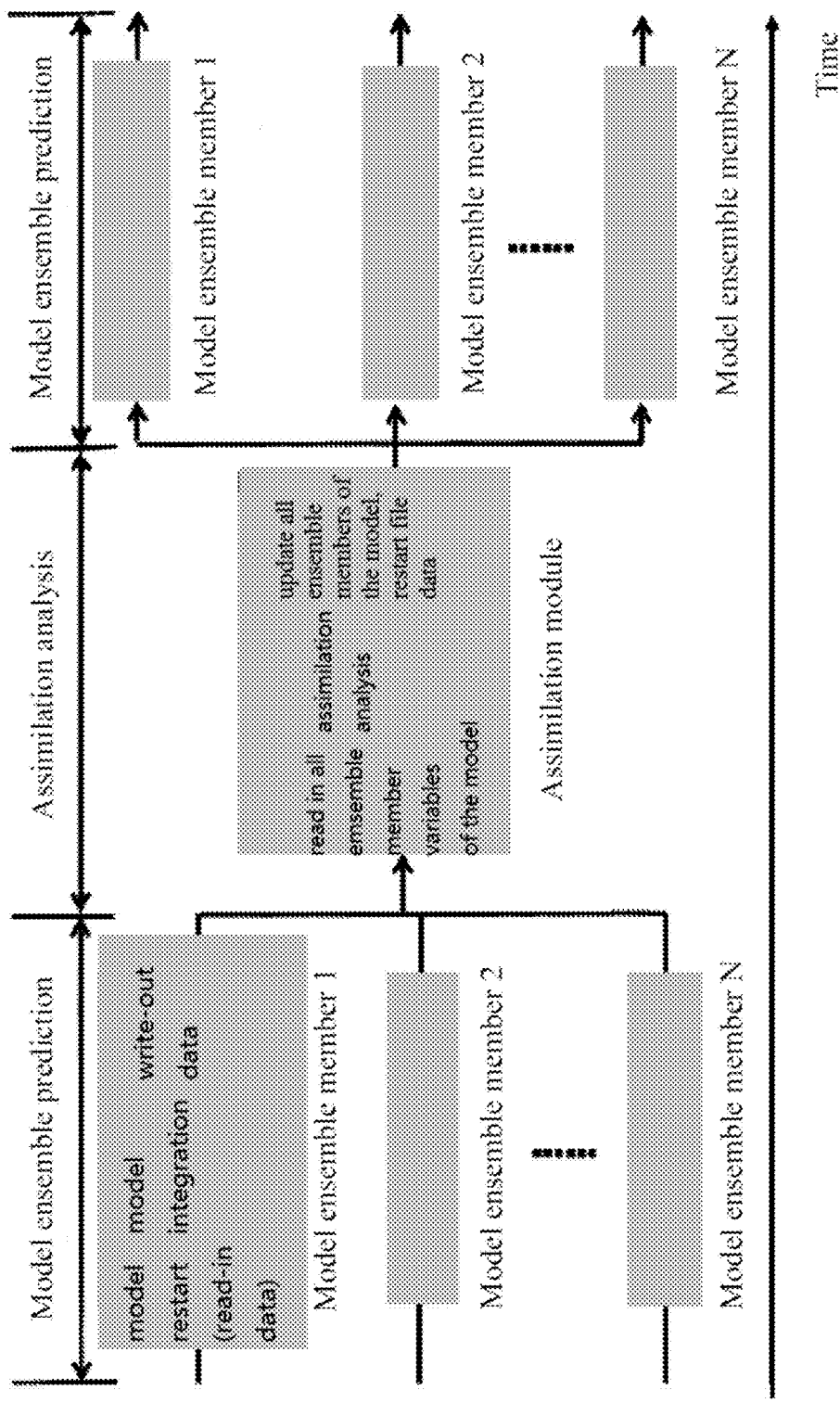
FIG. 1 is a schematic diagram of an assimilation system realized based on data file reading and writing according to some situations.
Figure 2:
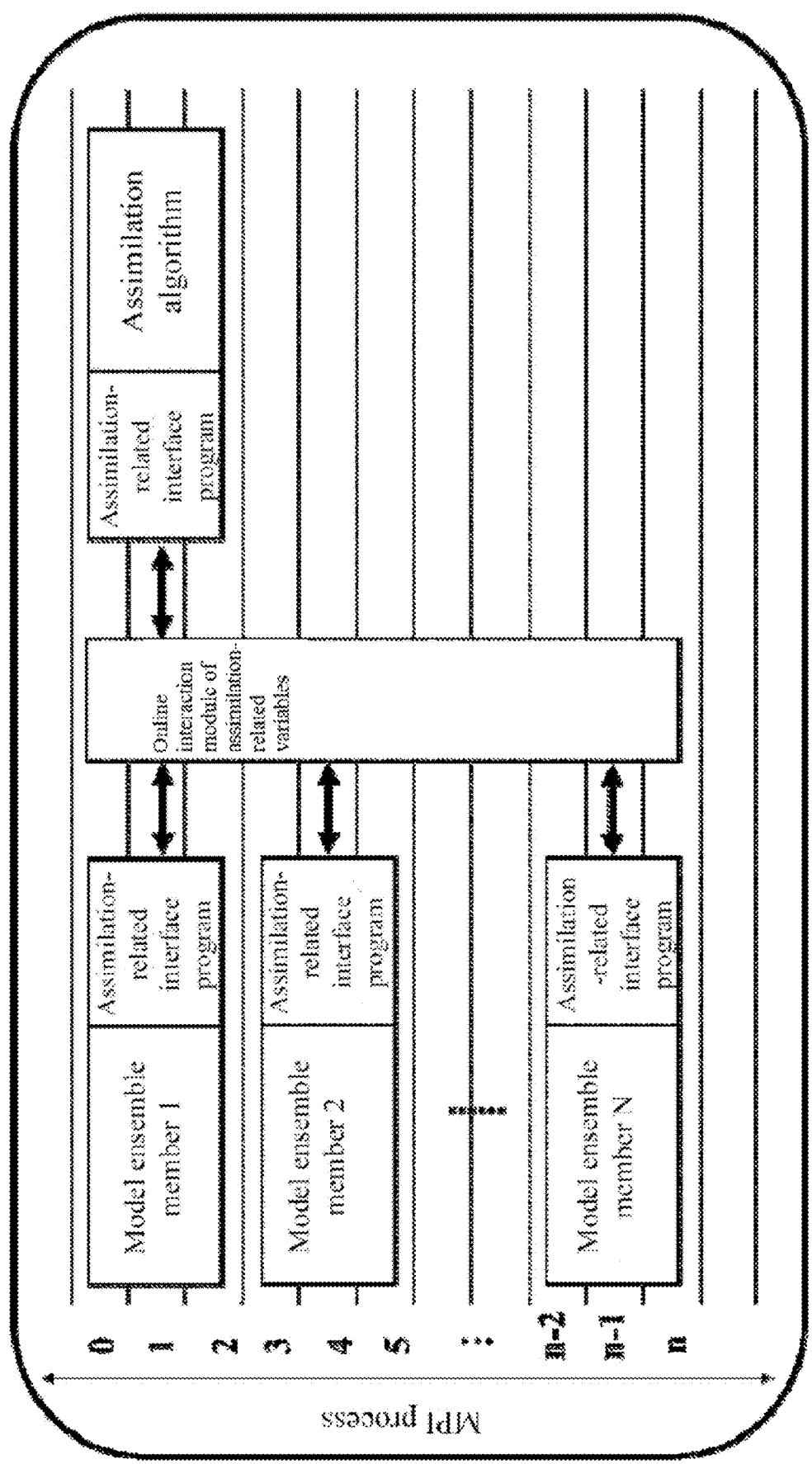
FIG. 2 is a schematic diagram of an assimilation system realized based on a method of model framework reconstruction in some situations.
Figure 3:
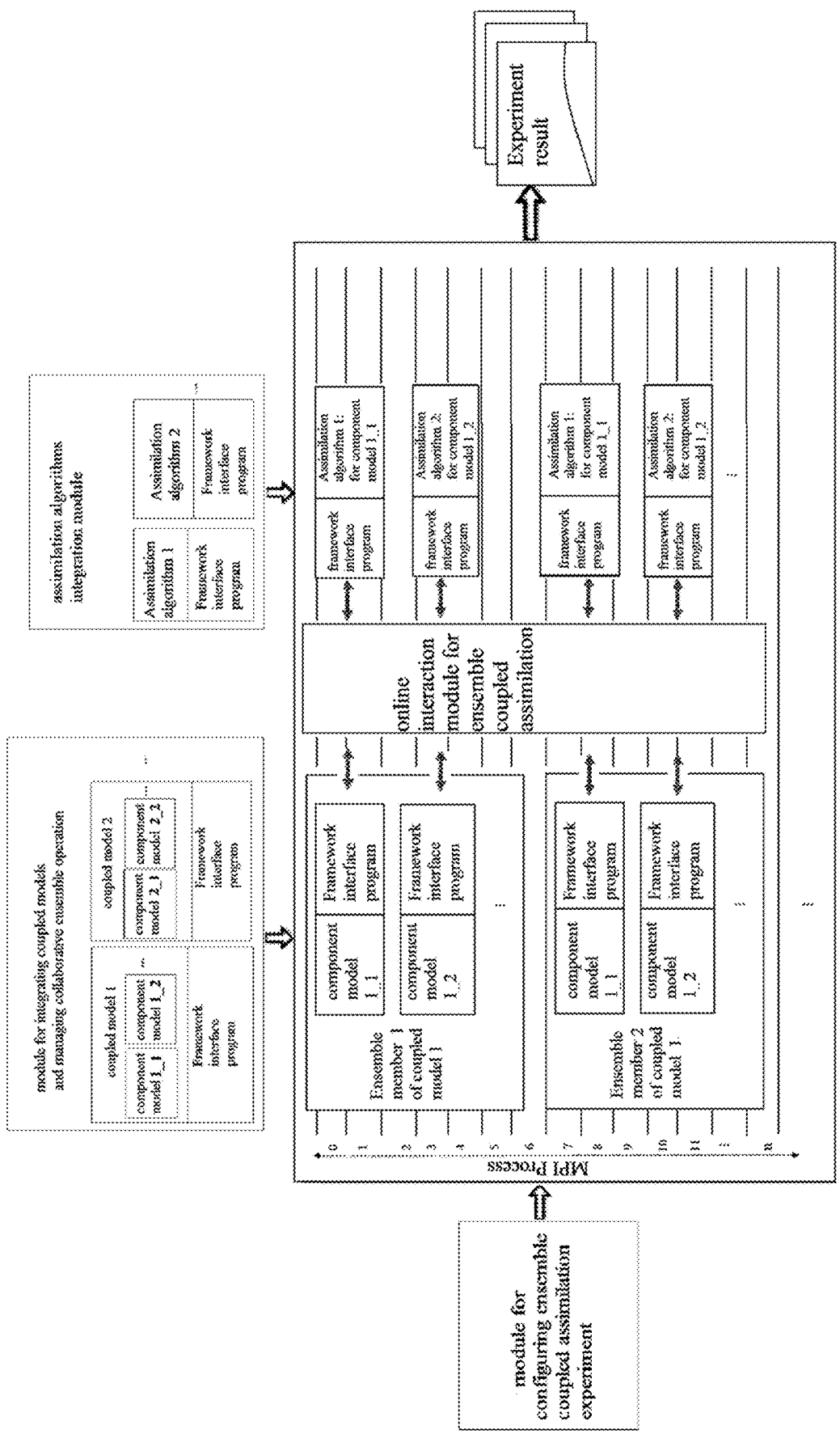
FIG. 3 is a schematic structural diagram of an ensemble coupled assimilation system for numerical prediction provided by an implementation of the present disclosure.

As shown in FIG. 3, it shows a schematic framework diagram of an ensemble coupled assimilation system for numerical prediction according to an implementation of the present disclosure. In this implementation, the ensemble coupled assimilation system for numerical prediction mainly includes four modules: a module for integrating coupled models and managing collaborative ensemble operation, an assimilation algorithms integration module, a module for configuring ensemble coupled assimilation experiment and an online interaction module for ensemble coupled assimilation.

The module for integrating coupled models and managing collaborative ensemble operation is configured to integrate any coupled models to realize operations, such as one-click configuration and one-click compilation, of a plurality of ensemble members in the same coupled model, start simultaneous parallel operation of all the ensemble members in the same MPI task, and manage working directories of all the ensemble members. The coupled models successfully integrated by the module for integrating coupled models and managing collaborative ensemble operation are generally parallel programs operated by a plurality of MPI processes, and has realized framework interface programs using application program interfaces (APIs) provided by the online interaction module for ensemble coupled assimilation.

The assimilation algorithms integration module is configured to integrate any assimilation algorithms or assimilation algorithm libraries, and can automatically compile the assimilation algorithms or assimilation algorithm libraries into dynamic link libraries for indirect calling by the models. The assimilation algorithms or assimilation algorithm libraries successfully integrated by the assimilation algorithms integration module realize framework interface programs using application program interfaces (APIs) provided by the online interaction module for ensemble coupled assimilation.

The module for configuring ensemble coupled assimilation experiment is configured to configure an ensemble coupled assimilation experiment by a user. The module supports the user to select the coupled models, to select the assimilation algorithm adopted by each component model, to set the number of the ensemble members, to set assimilation variables processed by each assimilation algorithm, as well as to set the assimilation frequency of each assimilation algorithm.

The online interaction module for ensemble coupled assimilation is configured to complete online interaction between the component models and the assimilation algorithms in the process of simultaneous parallel operation of all the ensemble members in the same coupled model in the same MPI task.

The above-mentioned online interaction module for ensemble coupled assimilation includes an application program interface submodule, an assimilation configuration information interface submodule, an assimilation algorithm operation management submodule, an ensemble calculation operation submodule, a data online exchange submodule, a data parallel interpolation submodule, and an interaction program process management submodule.

The application program interface submodule is configured to provide different application program interfaces for the ensemble coupled assimilation system for numerical prediction. The application program interfaces include: an application program interface (API) for the collaborative operation of all the ensemble members in the coupled models, an application program interface (API) for starting/operating/ending assimilation algorithm instances by the models, an application program interface (API) for specifying input/output variable information by the models, an application program interface (API) for obtaining input parameter information from the component models by the assimilation algorithms, an application program interface (API) for declaring input/output variables by the assimilation algorithms, and an application program interface (API) for obtaining assimilation experiment configuration information. The input/output variable information specified by the models includes variable name, located grid, parallel subdivision and storage space information.

The assimilation configuration information interface submodule is configured to read-in and parse the selection for the coupled models, the selection for the assimilation algorithms, the assimilation variables and the assimilation frequency configuration information from the module for configuring ensemble coupled assimilation experiment.

The assimilation algorithm operation management submodule is configured to manage all the assimilation algorithm instances. As for each assimilation algorithm instance, the assimilation algorithm operation management submodule starts, operates and ends the assimilation algorithm instances by using the MPI processes of all the ensemble members of the corresponding component model. In the starting process, loading of dynamic link libraries and the assimilation algorithms therein is automatically completed.

The ensemble calculation operation submodule is configured to, according to the assimilation experiment configuration information and the input/output variables declared by the assimilation algorithms, automatically complete the ensemble operations for each variable including ensemble aggregation, ensemble average, ensemble maximization, ensemble minimization and distribution when the component models interact with the assimilation algorithms, and automatically obtain the time average of the model variables when the average amount of time is used for assimilation.

The data online exchange submodule is configured to complete parallel data transfer of relevant variables between the MPI processes of all ensemble members of the same component model and the MPI process of the corresponding assimilation algorithm instances. The parallel data transfer of the relevant variables relates to MPI data communication.

The data parallel interpolation submodule is configured to complete parallel interpolation of variable data between different grids when the component models are different from the corresponding assimilation algorithm instances in grid.

The interaction program process management submodule is configured to call the corresponding functions of the assimilation algorithm operation management submodule, the ensemble calculation operation submodule, the data online exchange submodule and the data parallel interpolation submodule, and to, according to information from the application program interfaces and the assimilation configurations, automatically construct the online interaction program processes between the component models and the assimilation algorithms when the component models start the assimilation algorithm instances, automatically operate the online interaction program processes when the component models operate the assimilation algorithms, and automatically end the online interaction program processes when the component models end the assimilation algorithm instances.

The implementations of the present disclosure also provide an ensemble coupled assimilation method for numerical prediction. The method can realize collaborative operation of all ensemble members in the same coupled model in the same MPI task, support the flexible use of different assimilation algorithm instances by different component models, support one assimilation algorithm instance to use all MPI processes of all ensemble members of the corresponding component model to perform parallel operation, complete efficient online interaction between the model and the assimilation algorithm without using data file, and complete, in the online interaction process, a plurality of ensemble data operations, data interpolation between different grids, etc. Ultimately the operating efficiency of the corresponding assimilation system and the flexibility of assimilation configuration are improved.

The ensemble coupled assimilation method for numerical prediction is realized based on the ensemble coupled assimilation system for numerical prediction. The ensemble coupled assimilation method includes the following steps.

Step 1: assimilation algorithms or assimilation algorithm libraries are integrated. All codes of the assimilation algorithms or the assimilation algorithm libraries and corresponding input data including observation data are integrated into an assimilation algorithms integration module. As a result, the assimilation algorithms or the assimilation algorithm libraries can be automatically compiled into dynamic link libraries. Based on the APIs in the application program interface submodule, framework interface programs of the assimilation algorithms or the assimilation algorithm libraries are developed, starting programs, operating programs and ending programs of the assimilation algorithms or the assimilation algorithm libraries are connected, declaration of input/output variables by the assimilation algorithms is completed, the input/output variables of the assimilation algorithms are connected.

Step 2: coupled models are integrated. All codes of the coupled models and corresponding input data including starting data and external-forcing data are integrated into the module for integrating coupled models and managing collaborative ensemble operation. As a result, all the ensemble members in the coupled models can be configured with one click, compiled with one click as well as simultaneously operated with one click. Based on the APIs in the application program interface submodule, framework interface programs of the models are developed. Collaborative operation of all the ensemble members in the models is realized, information of input/output variables of the models is specified, and the API for starting/operating/ending the assimilation algorithm instances is called.

Step 3: configurations for ensemble coupled assimilation experiment are set. After selecting a coupled model, the number of the ensemble members of the assimilation experiment is set, the assimilation algorithm used by each component model is selected, and the assimilation variables and the assimilation frequency of each assimilation algorithm instance is set. In the selection of the assimilation algorithm of each component model, some component models may not use an assimilation algorithm. The component model include a plurality of component models.

Step 4: the ensemble coupled assimilation system is operated. After completing the compiling of all the codes, the module for integrating coupled models and managing collaborative ensemble operation is used to operate the ensemble coupled assimilation system, and efficient online interaction between the component models and the assimilation algorithms are realized.

The ensemble coupled assimilation system for numerical prediction and the method thereof provided by the implementations of the present disclosure can support one assimilation algorithm instance to use all MPI processes of all ensemble members of the corresponding component model to perform parallel operation, complete efficient online interaction between the model and the assimilation algorithm without using data file, and improve the operating efficiency of the corresponding assimilation system and the flexibility of assimilation configuration.

The disclosure can realize collaborative operation of all the ensemble members in the same coupled model in the same MPI task, support the flexible use of different assimilation algorithm instances by different component models, support one assimilation algorithm instance to use all MPI processes of all ensemble members of the corresponding component model to perform parallel operation. Ultimately the operating efficiency of the corresponding assimilation system and the flexibility of assimilation configuration are improved.

It should be understood by those skilled in the art that the technical solutions of the disclosure may be modified or equivalently substituted without departing from the spirit and scope of the technical solutions of the disclosure.

The invention claimed is:

1. An ensemble coupled assimilation system for numerical prediction, comprising:
a model integration processor for integrating coupled models and managing collaborative ensemble operation is configured to integrate any of the coupled models to realize operations of configuration and compilation of a plurality of ensemble members in same coupled model, and initiate a simultaneous parallel operation of all of the ensemble members in same MPI task;
an assimilation algorithms integrator is configured to integrate any assimilation algorithms or assimilation algorithm libraries, and can automatically compile the assimilation algorithms or the assimilation algorithm libraries into dynamic link libraries for indirect calling by component models;
a configurator for configuring ensemble coupled assimilation experiment is configured to configure the ensemble coupled assimilation experiment by a user, and support the user to select the coupled models, to select at least one of the assimilation algorithms for each component model, to set a number of the ensemble members, to set assimilation variables processed by each assimilation algorithm, and to set assimilation frequency of said each assimilation algorithm;

the online interactor for ensemble coupled assimilation is configured to complete online interaction between the component models and the assimilation algorithms in a process of the simultaneous parallel operation of all of the ensemble members in the same coupled model in the same MPI task.

2. The ensemble coupled assimilation system according to claim 1, wherein the online interactor for the ensemble coupled assimilation comprises:

an assimilation configuration information interface, configured to read-in and parse user-selected coupled models, user-selected assimilation algorithms, the assimilation variables, and the assimilation frequency from the configurator for configuring the ensemble coupled assimilation experiment.

3. The ensemble coupled assimilation system according to claim 2, wherein the online interactor for the ensemble coupled assimilation further comprises:

an assimilation algorithm operation manager, configured to manage all assimilation algorithm operation instances, and wherein in a process for initiating the assimilation algorithm operation instances, loading of the dynamic link libraries and the assimilation algorithms therein is automatically completed.

4. The ensemble coupled assimilation system according to claim 3, wherein the online interactor for the ensemble coupled assimilation further comprises:

an ensemble calculation operator, configured to, according to assimilation experiment configuration information from the configurator for configuring the ensemble coupled assimilation experiment and input/output variables declared by the assimilation algorithms, automatically complete the collaborative ensemble operations for each input/output variable when the component models interact with the assimilation algorithms.

5. The ensemble coupled assimilation system according to claim 4, wherein the online interactor for the ensemble coupled assimilation further comprises:

a data online exchanger, configured to complete parallel data transfer of relevant variables between MPI processes of all of the ensemble members of a same component model and an MPI process of corresponding assimilation algorithm operation instances.

6. The ensemble coupled assimilation system according to claim 5, wherein the online interactor for the ensemble coupled assimilation further comprises:

a data parallel interpolator, configured to, when a grid of a component models differs from a grid of a corresponding assimilation algorithm operation instance, perform parallel interpolation of variable data between the different grids.

7. An ensemble coupled assimilation method for the numerical prediction that is realized based on the ensemble coupled assimilation system according to claim 1, the method comprises:

integrating the assimilation algorithms or the assimilation algorithm libraries, integrating all codes and corresponding input data of the assimilation algorithms or the assimilation algorithm libraries into the assimilation algorithms integrator, so as to enable the assimilation algorithms or the assimilation algorithm libraries to be automatically compiled into the dynamic link libraries;

integrating the coupled models, and integrating all codes and corresponding input data of the coupled models into the model integration processor for integrating the coupled models and managing the collaborative ensemble operation, so as to enable all of the ensemble members of the coupled models to be configured, compiled and simultaneously operated;

setting configurations for the ensemble coupled assimilation experiment, after selecting the coupled models, setting the number of the ensemble members of the ensemble coupled assimilation experiment, and selecting the at least one of the assimilation algorithms used by said each component model;

operating the ensemble coupled assimilation system, after completing compiling of all the codes of the assimilation algorithms or the assimilation algorithm libraries and the codes of the coupled models using the model integration processor to operate the ensemble coupled assimilation system.

8. The ensemble coupled assimilation method according to claim 7, wherein the step of integrating the assimilation algorithms or the assimilation algorithm libraries further comprises:

based on application program interfaces, generating framework interface programs of the assimilation algorithms or the assimilation algorithm libraries, connecting initiating programs, operating programs and ending programs of the assimilation algorithms or the assimilation algorithm libraries, completing declaration of input/output variables by the assimilation algorithms, connecting the input/output variables of the assimilation algorithms.

9. The ensemble coupled assimilation method according to claim 8, wherein in the step of integrating the coupled models, the corresponding input data of the coupled models comprise initialization data and external-forcing data.

10. The ensemble coupled assimilation method according to claim 9, wherein the step of setting the configurations for the ensemble coupled assimilation experiment further comprises:

setting assimilation variables and assimilation frequency of each assimilation algorithm operation instance.

* * * * *